US005661885A

United States Patent [19]

Donato

[11] Patent Number: 5,661,885
[45] Date of Patent: Sep. 2, 1997

[54] VALVE-SPRING COMPRESSING TOOL

[76] Inventor: Carl J. Donato, 15 Edwin Rd., Morris Plains, N.J. 07950

[21] Appl. No.: 573,072

[22] Filed: Dec. 15, 1995

[51] Int. Cl.[6] ........ B23P 19/04
[52] U.S. Cl. ........ 29/220
[58] Field of Search ........ 29/219, 220, 215, 29/267, 402.08, 426.5, 888.42, 888.46

[56] References Cited

U.S. PATENT DOCUMENTS 1,401,920 12/1921 Paine ........ 29/220
4,176,435 12/1979 Castoe ........ 29/220
4,567,634 2/1986 Landry ........ 29/220
5,365,647 11/1994 Senkow ........ 29/220

*Primary Examiner*—Robert C. Watson
*Attorney, Agent, or Firm*—Bernard J. Murphy

[57] ABSTRACT

A body having a journal box slidably receives a pivot shaft therein. Too, the body has a bifurcation, and the ends of the limbs thereof have rollers mounted therein. A stub, rising from the body, receives a handle for turning the body on the pivot shaft, so that the rollered limbs can compress a valve spring. A bearing annulus, for emplacement upon the subject spring or spring assembly is also provided.

9 Claims, 2 Drawing Sheets

FIG. 3
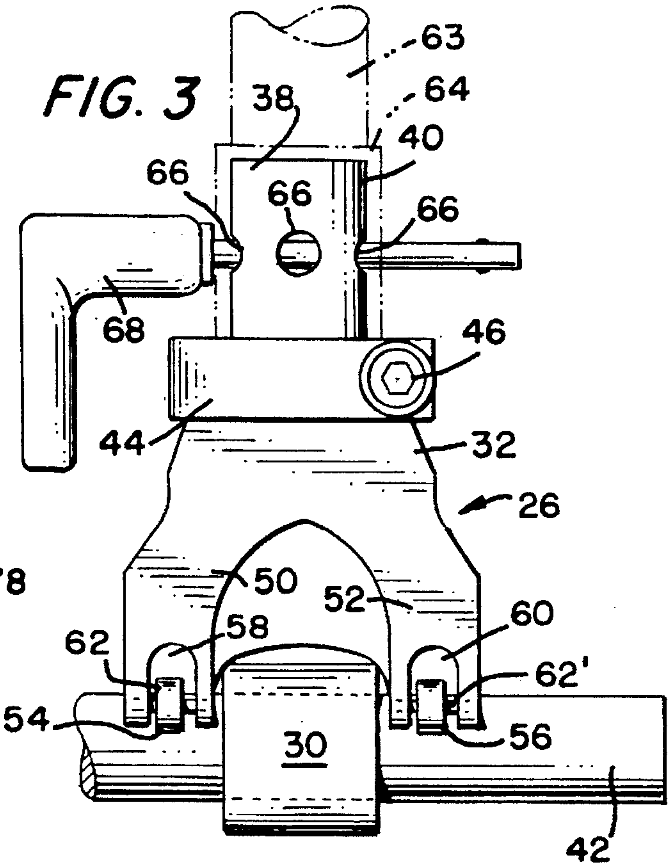
FIG. 6
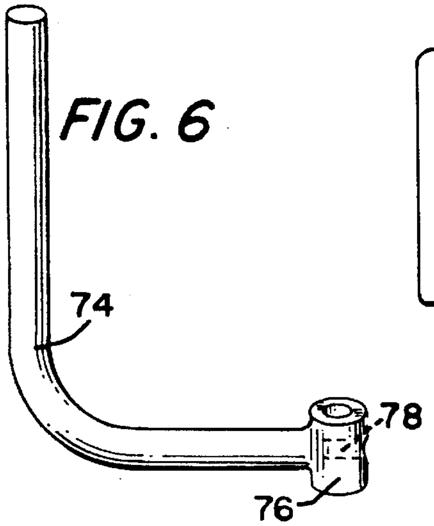
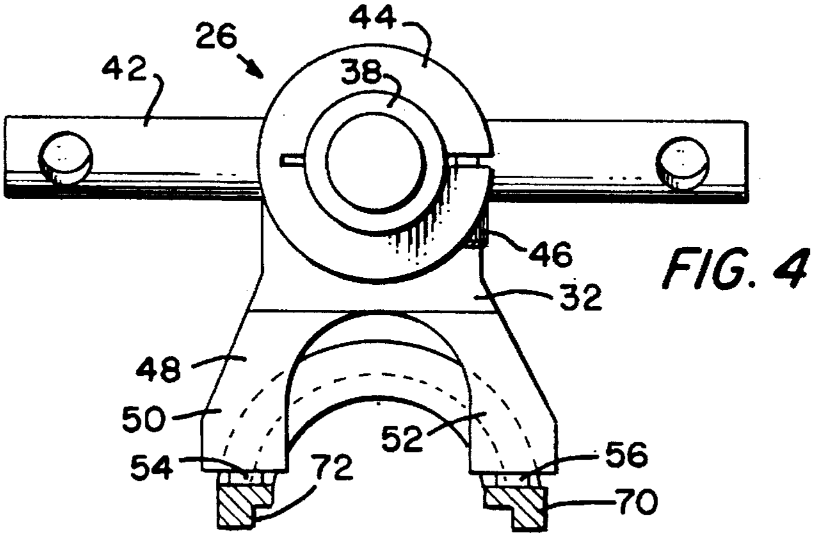
FIG. 4
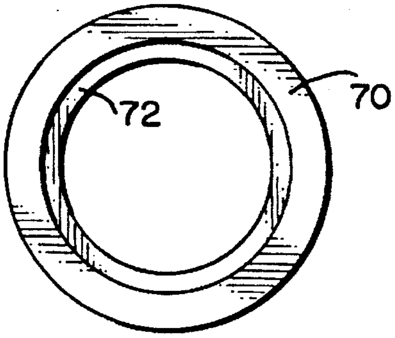
FIG. 5

VALVE-SPRING COMPRESSING TOOL

This invention pertains to tools such as are used in the maintenance and repair of internal combustion engines, and in particular to a valve spring compressing tool of novel features and facility.

Internal combustion engines have intake and exhaust valves which are controlled with powerful springs, and in the maintenance, servicing, repair and rebuild of such engines, it becomes necessary to compress these springs to enable their replacement. In the prior art there are valve spring compressing tools, but such are either complex of manufacture, or too expensive for the maintenance personnel to afford. What has been necessary and long sought is a simple, inexpensive, and efficient valve spring compressing tool. Accordingly, it is an object of this invention to set forth just such a long sought and needed tool.

Particularly, it is an object of this invention to disclose a novel valve spring compressing tool comprising a body; wherein said body has first means for journaling a pivot shaft therewithin; said body also has second means for rotatably pivoting said body on a pivot shaft; and said body further has third means for (a) engaging a valve spring, and (b) in cooperation with said first and second means, compressing such valve spring.

Further objects of this invention, as well as the novel features thereof, will become apparent by reference to the following description, taken in conjunction with the accompanying figures, in which:

FIG. 3 is a front elevational view of the tool of FIG. 2;

FIG. 4 is a plan or top view of the tool;

FIG. 5 is a bottom plan view of a bearing annulus; and

FIG. 6 is a perspective illustration of an angled, operating handle.

Figure 1:
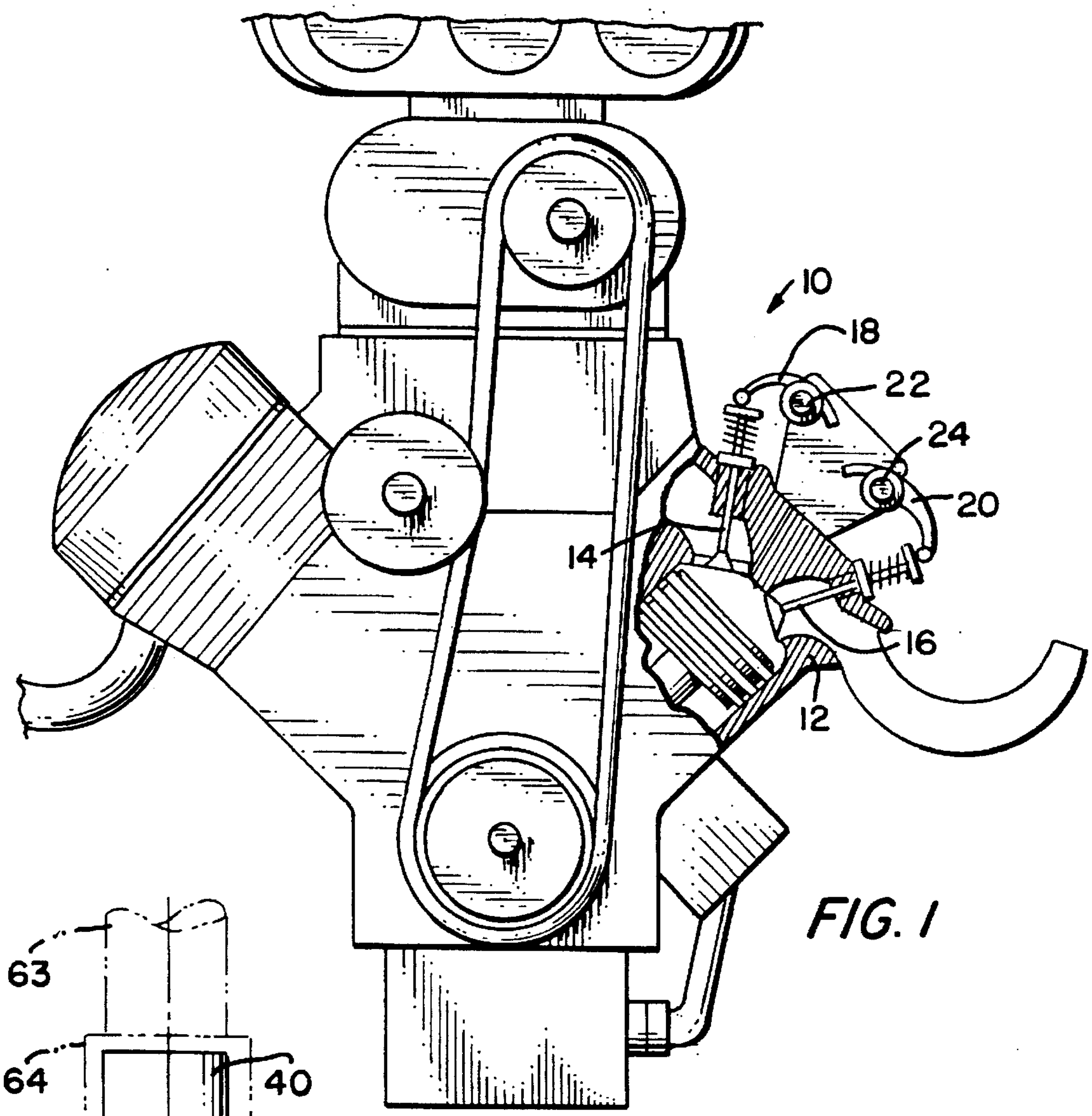
FIG. 1 is an elevational view of an engine in which a cylinder head is shown in cross-section, the same depicting valves, springs therefor, rocker arms and rocker arm shafts.

FIG. 1 depicts an internal combustion engine 10, and a cylinder head 12 thereof is shown in cross-section. As is common in this technology, the head-confined valves 14 and 16 are translated (by camming means not shown) through a rocking motion of rocker arms 18 and 20 which are journaled on rocker arm shafts 22 and 24 which are secured to the head 12 (by hardware not shown). It is a novel teaching of my invention to employ the rocker arm shafts as pivot shafts for my valve spring compressing tool.

Figure 2:
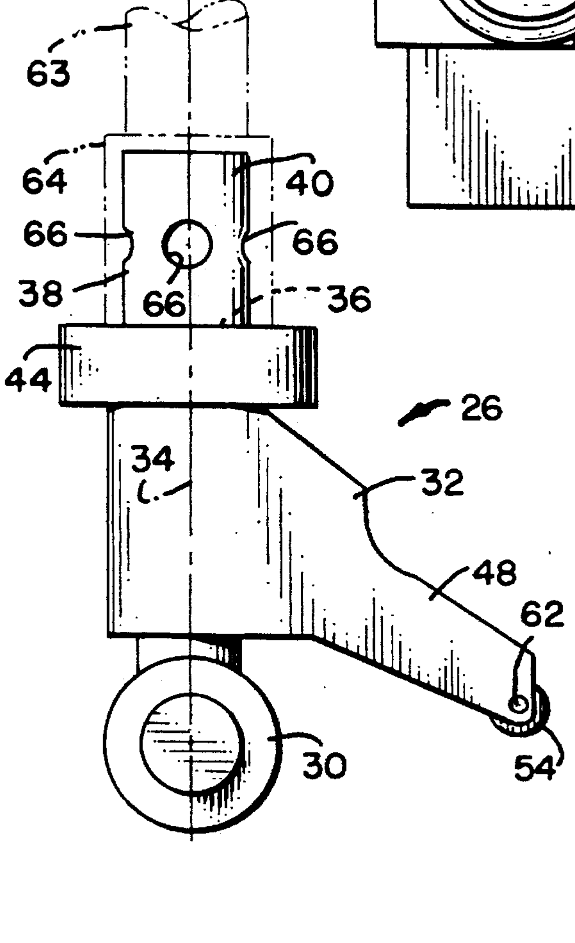
FIG. 2 is a side elevational view of the inventive valve spring compressing tool, according to an embodiment thereof.

My inventive valve spring compressing tool 26, according to an embodiment thereof, is shown in FIG. 2. The tool 26 comprises a housing 32 which has a longitudinal axis 34 and an axial bore 36 formed therethrough. A shaft 38 is disposed in the bore 36, and opposite shaft ends project from the housing 32. A journal box 30 is formed on one end of the shaft 38, and the opposite end of the shaft 38 comprises a hollow, cylindrical stub 40. As FIGS. 3 and 4 show, the journal box 30 receives a pivot shaft 42 therein. A split collar 44 is set about the shaft 38, and tightened by means of the hexagonal-socket machine screw 46, to clamp the shaft 38 fast in the housing 32.

Extending from the housing 32, and integral therewith, is a bifurcation 48, the latter projecting substantially diagonally relative to the axis 34. The terminal ends of the branches or limbs 50 and 52 have rollers 54 and 56 rotatably mounted thereon. Limbs 50 and 52 have recesses 58 and 60 formed therein, at the ends thereof, and axles 62 and 62' traverse the ends and the recesses 58 and 60 to rotatably mount the rollers 54 and 56 thereat. The stub 40 comprises means for rotatably pivoting the housing 32 on the pivot shaft 42. To afford a mechanical advantage, the stub 40 is defined to receive an operating handle 63 (shown in phantom in FIGS. 2 and 3). Stub 40 slidably receives a socket end 64 of the handle 63 thereupon. To insure that the socket end 64 does not remove, inadvertently, from the stub 40, it is a teaching of this disclosure to provide for a pinning of the stub 40 and socket end 64 together. Stub 40 has apertures 66 formed therein, and the handle socket end 64 requires matching apertures for common alignment with the apertures 66. Then, with the socket end 64 set onto the stub 40, a pinning accessory 68 is penetrated through the aligned apertures to hold the handle 63 in place.

In use of the tool 26, the mechanic or serviceman unbolts a rocker arm shaft, such as shaft 22 or 24, removes the rocker arms therefrom, slides the shaft into the journal box 30, to serve as the aforesaid pivot shaft 42, and then bolts the shaft 42, i.e. the rocker arm shaft, back in place on the engine. Next, a bearing annulus 70, such as is shown in FIG. 5, is set upon the valve spring assembly which is to be worked. The handle 63 is rotated to bring the rollers 54 and 56 into engagement with the annulus 70, as shown in FIG. 4, and then the handle is pulled forwardly, i.e., toward the bifurcation 48. The tool 26 will rotate about the shaft 42, the rollers 54 and 56 will roll upon the annulus 70, and the subject spring assembly will compress. The annulus 70 has a large, central void, and the spread or stance of the bifurcation, cooperate to provide a clear access to the spring retaining components, so that the latter can be removed to make the spring removable. All the while, however, the spring, notwithstanding the strength of its biasing force, is safely held in compressed condition, and with the pivoted arrangement of the tool 26, insures that the spring force can be relieved safely and gradually. The tool 26 also, of course, affords a safe, controlled, spring installation procedure as it will, with complete surety, hold the replacement spring in such compression as will be necessary to put the spring retaining components in place again.

The annulus 70, as shown in FIG. 5, has a stepped recess 72 formed therein, which insures that the annulus will remain captured atop the spring assembly and will not slide off during the spring compressing procedure.

Handle 63 comprehends a simple, straight implement. However, there arise circumstances in which a straight handle can not be accommodated, due to protruding, interfering engine components, or whatever. In such circumstances, an alternative handle 74, shown in FIG. 6 can be employed. Handle 74, as can be seen, describes an angle, and its socket end 76 has an aperture 78 formed therein which will align with one of the apertures 66 at the right or the left of the stub 40 for pinning with the accessory 68. Then, although the handle end, of handle 74, is remote from the tool 26, it can be pulled forwardly, the same as handle 63, to compress the spring with a same mechanical advantage and relative ease.

While I have described my invention in connection with a specific embodiment thereof, it is to be clearly understood that this is done only by way of example, and not as a limitation to the scope of my invention as set forth in the objects thereof, and in the appended claims.

I claim:

1. A valve spring compressing tool, comprising:

a housing; wherein said housing has a longitudinal axis; and said housing has a bore, extending axially thereof;

a shaft, disposed in said bore, and having opposite ends thereof extending from said housing; wherein one of said shaft ends comprises a first means for journaling a pivot shaft therewithin;

the other of said shaft ends comprises a second means for rotatably pivoting said housing on a pivot shaft; and said housing has a third means for (a) engaging a valve spring, and (b) in cooperation with said first and second means, compressing such valve spring.

2. A valve spring compressing tool, according to claim 1, wherein:

one of said ends comprises a journal box; and the other of said ends comprises a hollow, cylindrical stub.

3. A valve spring compressing tool, according to claim 1, further including:

a collar, set about said shaft, and clamping said shaft fast in said housing.

4. A valve spring compressing tool, according to claim 1, wherein:

said third means comprises a pair of limbs integral with said housing and projecting outwardly therefrom.

5. A valve spring compressing tool, according to claim 1, wherein:

said housing has a bifurcation, integral therewith, projecting therefrom substantially diagonally relative to said axis.

6. A valve spring compressing tool, according to claim 4, wherein:

said limbs have terminal ends; and further including rollers rotatably mounted on said terminal ends.

7. A valve spring compressing tool, according to claim 5, wherein:

branches of said bifurcation have terminal ends; and further including rollers rotatably set into, and extending from, said terminal ends.

8. A valve spring compressing tool, according to claim 2, wherein:

said third means comprises a pair of limbs integral with said housing and projecting therefrom;

said limbs have terminal ends;

rollers rotatably mounted on said terminal ends;

said rollers bisect given, parallel planes; and said journal box subsists between said planes.

9. A valve spring compressing tool, according to claim 8, wherein:

said rollers are rotatably mounted on axles which traverse said terminal ends;

said journal box has a through going hole; and said axles and hole have parallel axes.

* * * * *